(12) United States Patent
Hirschmann et al.

(10) Patent No.: US 7,220,464 B2
(45) Date of Patent: May 22, 2007

(54) NEMATIC LIQUID-CRYSTAL MIXTURE, AND DISPLAYS CONTAINING SAME

(75) Inventors: Harald Hirschmann, Darmstadt (DE); Volker Reiffenrath, Rossdorf (DE)

(73) Assignee: Merck Patent Gesellschaft, Darmstadt (DE)

( * ) Notice: Subject to any disclaimer, the term of this patent is extended or adjusted under 35 U.S.C. 154(b) by 286 days.

(21) Appl. No.: 10/777,203

(22) Filed: Feb. 13, 2004

(65) Prior Publication Data

US 2004/0161550 A1 Aug. 19, 2004

(30) Foreign Application Priority Data

Feb. 15, 2003 (DE) ................ 103 06 399

(51) Int. Cl.
*C09K 19/30* (2006.01)
*C09K 19/12* (2006.01)
*C09K 19/20* (2006.01)

(52) U.S. Cl. ............. 428/1.1; 252/299.63; 252/299.66; 252/299.67

(58) Field of Classification Search ........... 252/299.01, 252/299.63, 299.66, 299.67; 428/1.1
See application file for complete search history.

(56) References Cited

U.S. PATENT DOCUMENTS

| | | | | |
|---|---|---|---|---|
| 5,709,820 A | * | 1/1998 | Kato et al. ............. | 252/299.61 |
| 6,143,198 A | * | 11/2000 | Miyazawa et al. ..... | 252/299.61 |
| 6,217,792 B1 | * | 4/2001 | Parri et al. ............. | 252/299.61 |
| 6,440,506 B1 | * | 8/2002 | Kojima et al. ............... | 428/1.1 |
| 6,555,186 B2 | * | 4/2003 | Hirschmann et al. ........ | 428/1.1 |
| 2003/0186002 A1 | * | 10/2003 | Heckmeier et al. .......... | 428/1.1 |

FOREIGN PATENT DOCUMENTS

DE 4414647 * 11/1995

* cited by examiner

*Primary Examiner*—Shean C. Wu
(74) *Attorney, Agent, or Firm*—Millen, White, Zelano & Branigan, P.C.

(57) ABSTRACT

A nematic liquid-crystal mixture contains a compound of formula I

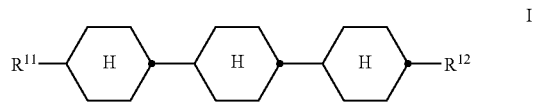

in which $R^{11}$ and $R^{12}$ are as defined in the specification, and a liquid-crystal displays containing same.

15 Claims, No Drawings

NEMATIC LIQUID-CRYSTAL MIXTURE, AND DISPLAYS CONTAINING SAME

The invention relates to novel liquid-crystal mixtures, to the use thereof in liquid-crystal displays, in particular in twisted nematic (TN) and super-twisted nematic (STN) liquid-crystal displays having very short response times and good steepnesses and angle dependencies, and to liquid-crystal displays containing the novel mixtures.

TN displays are known, for example from M. Schadt and W. Helfrich, Appl. Phys. Lett., 18, 127 (1971). STN displays are known, for example from EP 0 131 216 B1; DE 34 23 993 A1; EP 0 098 070 A2; M. Schadt and F. Leenhouts, 17th Freiburg Congress on Liquid Crystals (8.-10.04.87); K. Kawasaki et al., SID 87 Digest 391 (20.6); M. Schadt and F. Leenhouts, SID 87 Digest 372 (20.1); K. Katoh et al., Japanese Journal of Applied Physics, Vol. 26, No. 11, L 1784–L 1786 (1987); F. Leenhouts et al., Appl. Phys. Left. 50 (21), 1468 (1987); H. A. van Sprang and H. G. Koopman, J. Appl. Phys. 62 (5), 1734 (1987); T. J. Scheffer and J. Nehring, Appl. Phys. Left. 45 (10), 1021 (1984), M. Schadt and F. Leenhouts, Appl. Phys. Lett. 50 (5), 236 (1987) and E. P. Raynes, Mol. Cryst. Liq. Cryst. Letters Vol. 4 (1), pp. 1–8 (1986). The term STN here covers any relatively highly twisted display element having a twist angle with a value of between 160° and 360°, such as, for example, the display elements according to Waters et al. (C. M. Waters et al., Proc. Soc. Inf. Disp. (New York) (1985) (3rd Intern. Display Conference, Kobe, Japan), STN-LCDs (DE-A 35 03 259), SBE-LCDs (T. J. Scheffer and J. Nehring, Appl. Phys. Left. 45 (1984) 1021), OMI-LCDs (M. Schadt and F. Leenhouts, Appl. Phys. Left. 50 (1987), 236, DST-LCDs (EP-A 0 246 842) or BW-STN-LCDs (K. Kawasaki et al., SID 87 Digest 391 (20.6)).

Compared with standard TN displays, STN displays are distinguished by significantly better steepnesses of the electro-optical characteristic line and, at morate and relatively high multiplex rates, for example from 32 to 64 or higher, by better contrast values. By contrast, the contrast in TN displays is generally higher owing to the better dark value, and the angle dependence on the contrast is lower than in STN displays having low multiplex rates of, for example, less than 32.

Of particular interest are TN and STN displays having very short response times, in particular also at relatively low temperatures. In order to achieve short response times, the rotational viscosities of the liquid-crystal mixtures have hitherto been optimised using mostly monotropic additives having relatively high vapour pressure. However, the response times achieved were not adequate for every application.

In order to achieve a steep electro-optical characteristic line in the displays according to the invention, the liquid-crystal mixtures should have relatively large values for the ratio between the elastic constants $K_{33}/K_{11}$ and relatively small values for $\Delta\epsilon/\epsilon_{195}$, where $\Delta\epsilon$ is the dielectric anisotropy and $\epsilon_\perp$ is the dielectric constant perpendicular to the longitudinal molecular axis.

In addition to optimisation of the contrast and response times, further important requirements are made of mixtures of this type:
1. broad d/p window
2. high long-term chemical stability
3. high electrical resistance
4. low frequency and temperature dependence of the threshold voltage.

The parameter combinations achieved are still far from adequate, in particular for high-multiplex STN displays (with a multiplex rate in the region of about 1/400), but also for medium- and low-multiplex STN displays (with multiplex rates in the region of about 1/64 and 1/16 respectively), and TN displays. This is partly attributable to the fact that the various requirements are affected in opposite manners by material parameters.

Thus, there continues to be a great demand for liquid-crystal mixtures, in particular for medium- and low-multiplex STN displays, having very short response times at the same time as a large working-temperature range, high characteristic-line steepness, good angle dependence of the contrast and low threshold voltage which meet the above-mentioned requirements.

A particularly important requirement of TN and, in particular, STN displays is the reduction in the response times, in particular on use in mobile telephones and PDAs ("personal digital assistants"). For given values of operating-temperature range, layer thickness and electro-optical requirements, materials whose use results in a reduction in the rotational viscosity of the liquid-crystal mixture, and thus in a reduction in the response time of the liquid crystal display, are thus of interest.

The invention has the object of providing liquid-crystal mixtures for use in liquid-crystal displays, in particular in TN and STN displays, which do not have the above-mentioned disadvantages or only do so to a lesser extent and at the same time have short response times, in particular at low temperatures, and very good steepnesses, as well as improved an temperature dependence of the operating voltage owing to an improved frequency dependence of the dielectric constants.

It has now been found that this object can be achieved if use is made of nematic liquid-crystal mixtures which comprise one or more compounds of the formula I

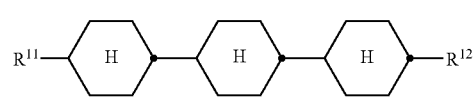

I where
$R^{11}$ is an alkenyl or alkenyloxy radical having from 2 to 7 carbon atoms; and
$R^{12}$ is an alkyl or alkoxy radical having from 1 to 12 carbon atoms or an alkenyl or alkenyloxy radical having from 2 to 12 carbon atoms, where, in addition, one or more $CH_2$ groups may be replaced by —O—, —S—, —C≡C—, —CO—, —OCO— or —COO— in such a way that heteroatoms (—O— and —S—) are not linked directly to one another.

The compounds of the formula I reduce, in particular, the viscosity and response time of TN and STN mixtures without at the same time significantly impairing the clearing point, birefringence or steepness of the electro-optical characteristic line.

In addition, it has been found, surprisingly, that the mixtures according to the invention, compared with the reference mixtures without compounds of the formula I, additionally also have a reduced threshold voltage and operating voltage at the same time as a significantly faster response time.

The mixtures according to the invention furthermore have long shelf lives in the LC display at low temperatures.

The application thus relates to a liquid-crystal mixture comprising at least one compound of the formula I

where
R$^{11}$ is an alkenyl or alkenyloxy radical having from 2 to 7 carbon atoms; and
R$^{12}$ is an alkyl or alkoxy radical having from 1 to 12 carbon atoms or an alkenyl or alkenyloxy radical having from 2 to 12 carbon atoms, where, in addition, one or more CH$_2$ groups may be replaced by —O—, —S—, —C≡C—, —CO—, —OCO— or —COO— in such a way that heteroatoms (—O— and —S—) are not linked directly to one another.

The invention also relates to corresponding liquid-crystal mixtures for use in liquid-crystal displays, in particular in TN and STN displays, particularly preferably in medium- and low-multiplexed STN displays.

The invention also relates to a liquid-crystal display (LC display) having
two outer plates, which, together with a frame, form a cell,
a nematic liquid-crystal mixture of positive dielectric anisotropy located in the cell,
electrode layers with alignment layers on the insides of the outer plates,
a tilt angle between the longitudinal axis of the molecules at the surface of the outer plates and the outer plates of from 0 degree to 30 degrees, and
a twist angle of the liquid-crystal mixture in the cell from alignment layer to alignment layer with a value of between 22.5° and 600°,
a nematic liquid-crystal mixture consisting of
   a) 15–80% by weight of a liquid-crystalline component A consisting of one or more compounds having a dielectric anisotropy of greater than +1.5;
   b) 20–85% by weight of a liquid-crystalline component B consisting of one or more compounds having a dielectric anisotropy of between −1.5 and +1.5;
   c) 0–20% by weight of a liquid-crystalline component D consisting of one or more compounds having a dielectric anisotropy of below−1.5, and
   d) if desired, an optically active component C in such an amount that the ratio between the layer thickness (separation of the outer plates) and the natural pitch of the chiral nematic liquid-crystal mixture is from about 0.2 to 1.3, where the liquid-crystal display is characterised in that the liquid-crystal mixture comprises at least one compound of the formula I.

Preferred compounds of the formula I are those in which R$^{11}$ and R$^{12}$ are alkenyl having from 2 to 7 carbon atoms. Preference is furthermore given to compounds of the formula I selected from the following formulae:

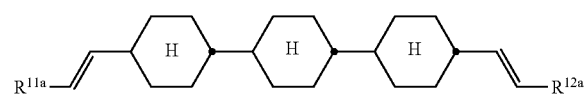

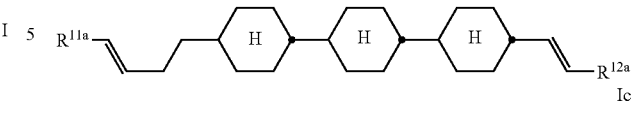

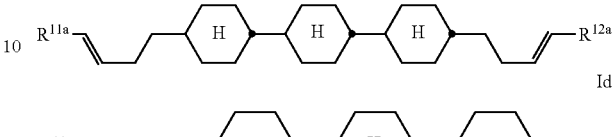

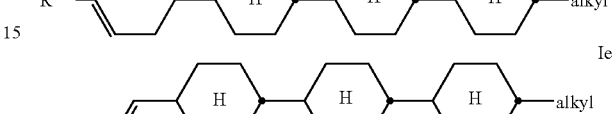

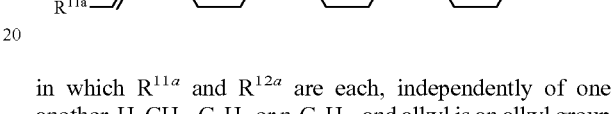

in which R$^{11a}$ and R$^{12a}$ are each, independently of one another, H, CH$_3$, C$_2$H$_5$ or n-C$_3$H$_7$, and alkyl is an alkyl group having from 1 to 8 carbon atoms.

Particular preference is given to compounds of the formula Ia, in particular those in which R$^{11a}$ and R$^{12a}$ are H or CH$_3$, and compounds of the formula Ie, in particular those in which R$^{11a}$ is H or CH$_3$.

The compounds of the formula I are present in the liquid-crystalline mixtures according to the invention in an amount of from 1 to 25% by weight, preferably from 2 to 20% by weight and in particular from 3 to 15% by weight.

Besides the compounds of the formula I, the mixtures according to the invention preferably comprise one or more alkenyl compounds of the formula II

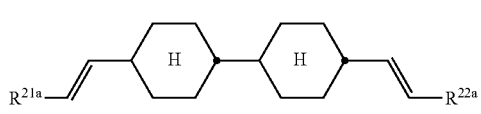

where
R$^{21}$ is as defined for R$^{11}$;
R$^{22}$ is as defined for R$^{12}$;
the ring A$^2$ is 1,4-phenylene or trans-1,4-cyclohexylene; and
a is 0 or 1;

with the proviso that at least one of the radicals R$^{21}$ and R$^{22}$ is an alkenyl radical.

Particularly preferred compounds of the formula II are selected from the formulae IIa to IIg

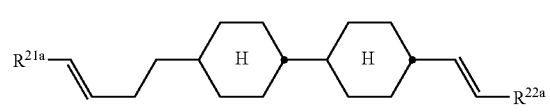

-continued

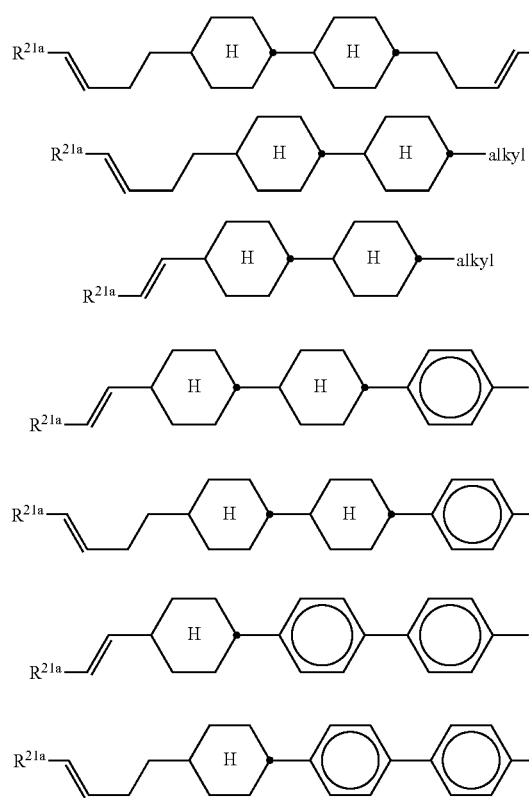

in which $R^{21a}$ and $R^{22a}$ are each, independently of one another, H, $CH_3$, $C_2H_5$ or n-$C_3H_7$, and alkyl is an alkyl group having from 1 to 8 carbon atoms.

Particular preference is given to compounds of the formula IIa, in particular those in which $R^{21a}$ and $R^{22a}$ are $CH_3$, and compounds of the formulae IIe, IIf, IIg, IIh and IIi, in particular those in which $R^{21a}$ is H or $CH_3$.

The use of compounds of the formula II in the liquid-crystal mixtures according to the invention results in particularly low values of the rotational viscosity and in TN and STN displays having high steepness and fast response times, in particular at low temperatures.

The compounds of the formulae 1 and II having a dielectric anisotropy of from −1.5 to +1.5 (dielectrically neutral compounds) are assigned to component B defined above.

Besides or as an alternative to the dielectrically neutral alkenyl compounds of the formula II, the mixtures according to the invention preferably comprise one or more dielectrically positive alkenyl compounds of the formula IIA

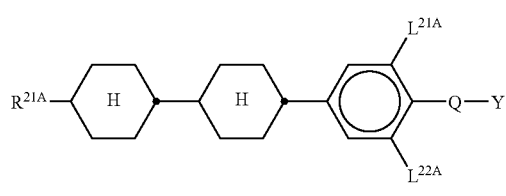

where $R^{21A}$ is an alkenyl radical having from 2 to 7 carbon atoms;
Q is $CF_2$, $OCF_2$, CFH, OCFH or a single bond;
Y is F or Cl; and
$L^{21A}$ and $L^{22A}$ are each, independently of one another, H or F.

Preferred compounds of the formula IIA are those in which $L^{21A}$ and/or $L^{22A}$ are F, and Q-Y is F or $OCF_3$.

Preference is furthermore given to compounds of the formula IIA in which $R^{21A}$ is 1E-alkenyl or 3E-alkenyl having from 2 to 7, in particular 2, 3 or 4, carbon atoms.

Particular preference is given to compounds of the formula IIAa

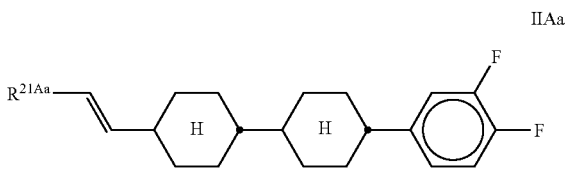

in which $R^{21Aa}$ is H, $CH_3$, $C_2H_5$ or n-$C_3H_7$, in particular H or $CH_3$.

The polar compounds of the formula IIA having a dielectric anisotropy of greater than +1.5 are assigned to component A defined above.

Component A preferably comprises one or more cyano compounds of the following formulae:

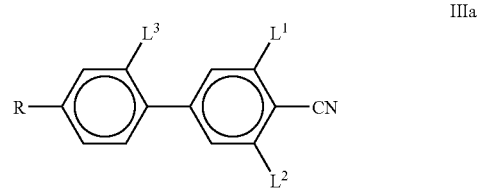

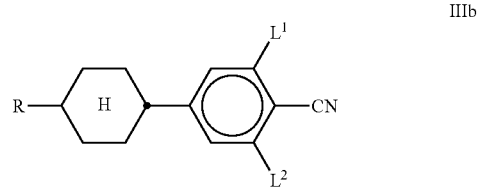

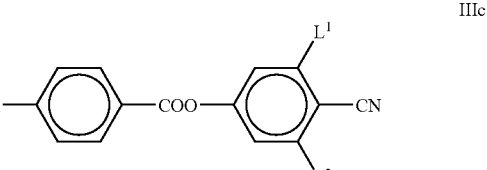

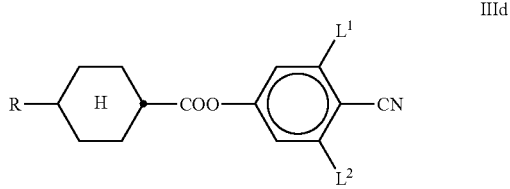

-continued

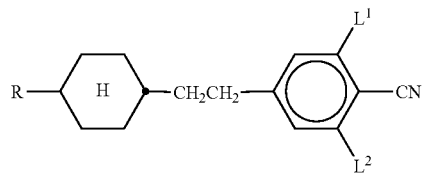

IIIe

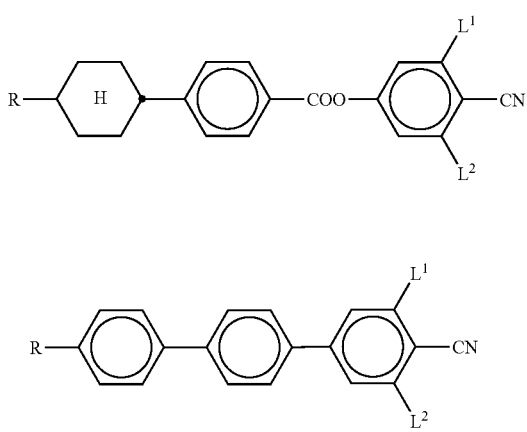

IIIf

IIIg

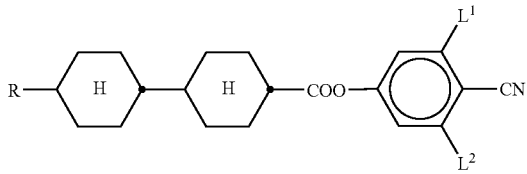

IIIh where
R is an alkyl or alkoxy radical having from 1 to 12 carbon atoms or an alkenyl radical having from 2 to 12 carbon atoms, where, in addition, one or more $CH_2$ groups in these radicals may be replaced by —O—, —S—, —C≡C—, —CO—, —OCO— or —COO— in such a way that heteroatoms (—O— and —S—) are not linked directly to one another; and
$L^1$, $L^2$ and $L^3$ are each, independently of one another, H or F.

R in these compounds is particularly preferably alkyl or alkoxy having from 1 to 8 carbon atoms or alkenyl having from 2 to 7 carbon atoms.

Particular preference is given to mixtures comprising one or more compounds of the formulae IIIb and/or IIIc, furthermore IIIf, in particular those in which $L^1$ and/or $L^2$ are F.

Very particular preference is given to mixtures which comprise one or more compounds of the formula IIIb in which R is alkenyl having from 2 to 7 carbon atoms, and $L^1$ and $L^2$ are H or F, in particular both are H, and/or of the formula IIIc in which R is alkyl having from 1 to 7 carbon atoms or alkenyl having from 2 to 7 carbon atoms, and $L^1$ and $L^2$, independently of one another, are H or F, where, in particular at least one of the substituents $L^1$ and $L^2$ is F.

Particular preference is given to compounds of the following formulae:

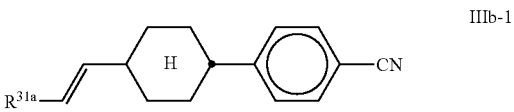

IIIb-1

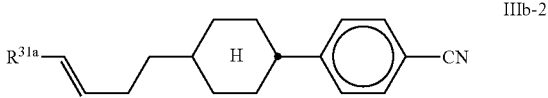

IIIb-2

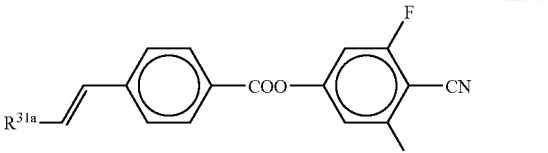

IIIc-1

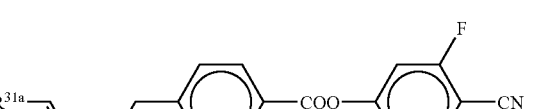

IIIc-2

IIIc-3

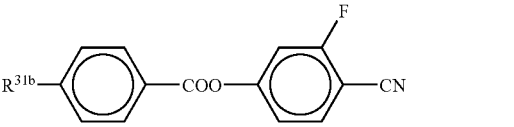

where $R^{31a}$ is H, $CH_3$, $C_2H_5$ or n-$C_3H_7$, in the formulae IIIb-1 and IIIb-2 preferably H or $CH_3$, in the formulae IIIc-1 and IIIc-2 preferably H or $C_2H_5$, and $R^{31b}$ in the formula IIIc-3 is H, $CH_3$, $C_2H_5$, n-$C_3H_7$, n-$C_4H_9$, n-$C_5H_{11}$ or n-$C_6H_{13}$, in particular $C_2H_5$, n-$C_3H_7$, n-$C_4H_9$ or n-$C_5H_{11}$. Preference is furthermore given to mixtures which comprise one or more compounds of the formula IIIh in which $L^2$ is H and $L^1$ is H or F, in particular F.

In a specific embodiment, component A preferably comprises one or more 3,4,5-trifluorophenyl compounds of the following formulae:

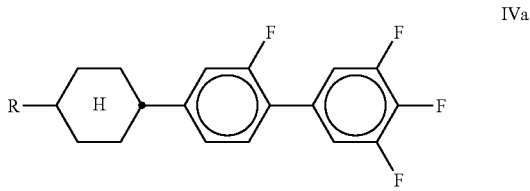

IVa

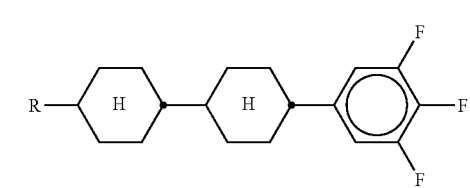
IVb
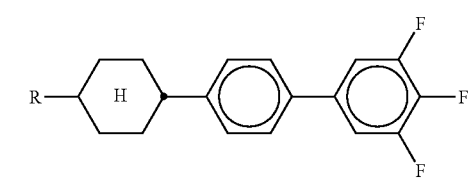
IVc
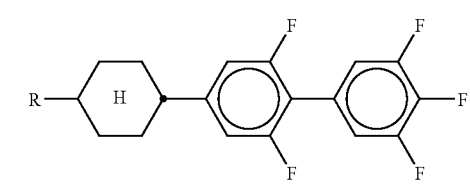
IVd
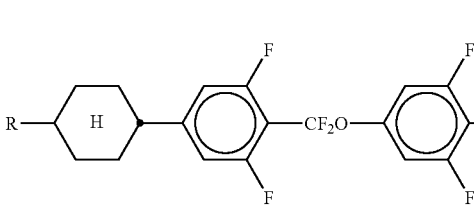
IVe
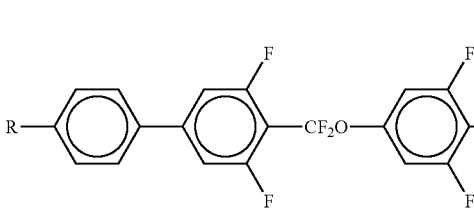
IVf
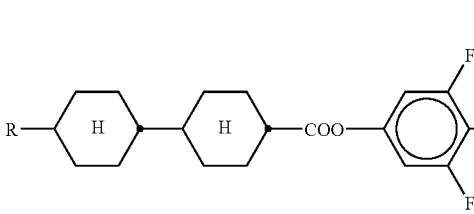
IVg
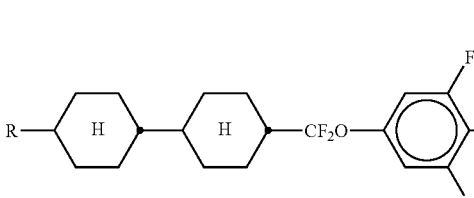
IVh
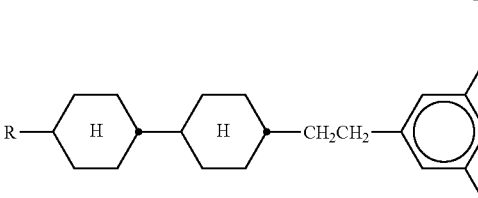
IVi
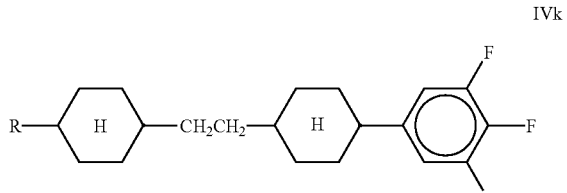
IVk
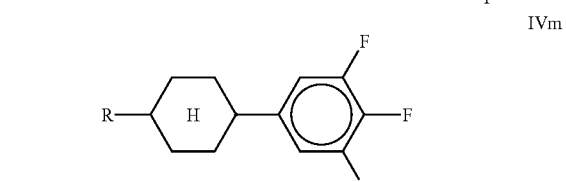
IVm
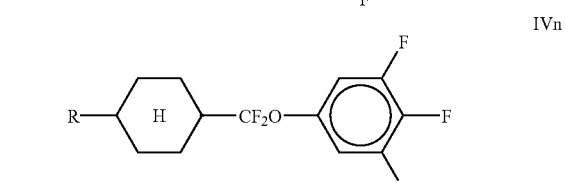
IVn
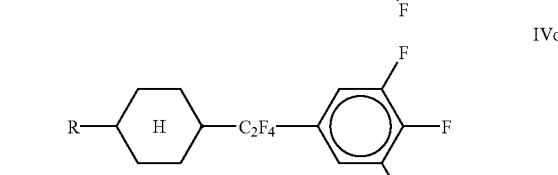
IVo
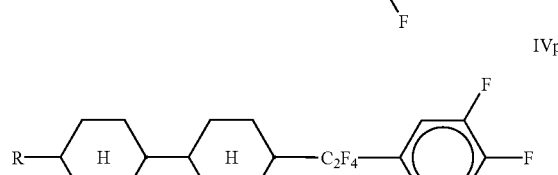
IVp
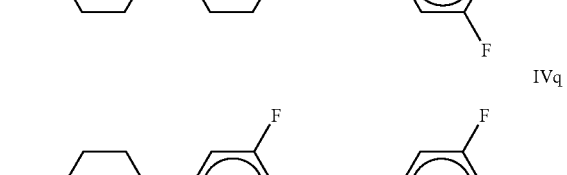
IVq
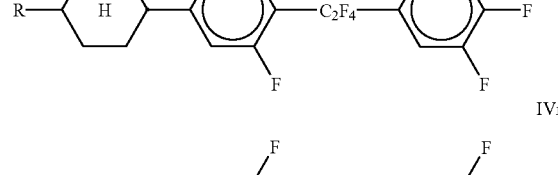
IVr
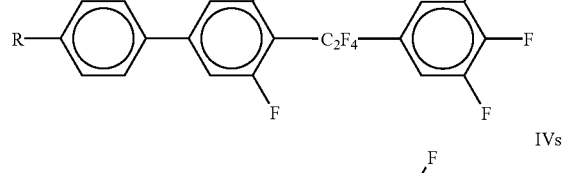
IVs
and optionally one or more compounds having a polar end group, of the following formulae:

Va
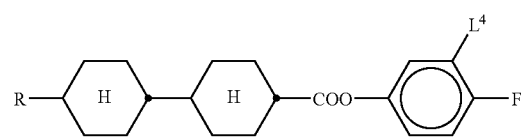
Vb
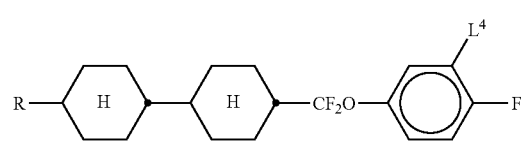
Vc
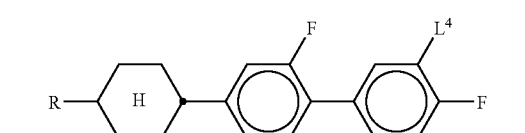
Vd
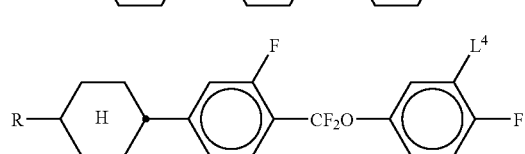
Ve
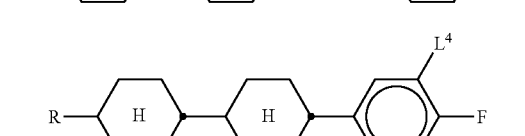
Vf
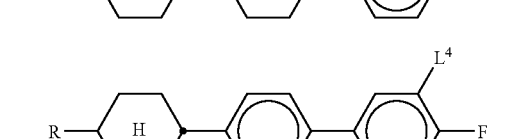
Vg
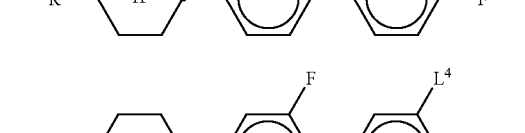
Vh
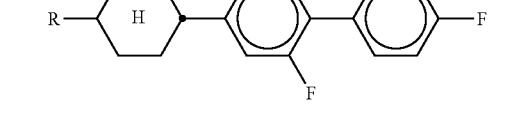
Vi
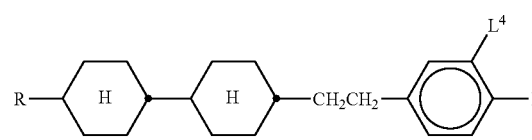
Vk
Vm
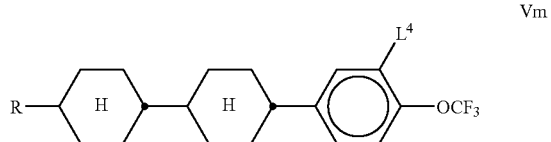
Vn
Vo
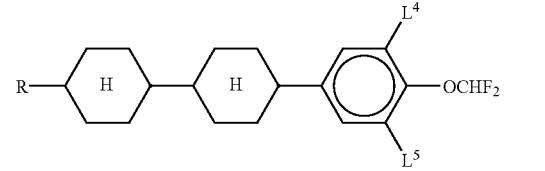
Vp
Vq
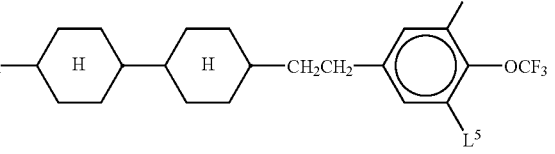
Vr
Vs
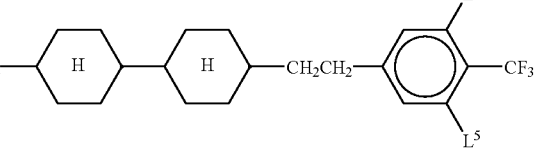
Vt
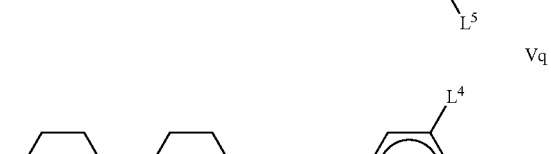

Vu

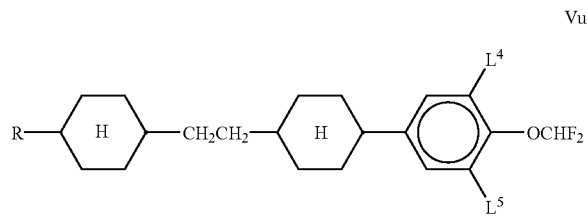

where R is as defined above for the formula II, and $L^4$ and $L^5$ are each, independently of one another, H or F. R in these compounds is particularly preferably alkyl or alkoxy having from 1 to 8 carbon atoms.

Particular preference is given to compounds of the formulae IVa, IVb, IVc, IVd, IVm and Vm, in particular compounds of the formulae IVa, IVm and Vm.

Preferred liquid-crystal mixtures comprise one or more compounds of component A, preferably in a proportion of from 15% to 80%, particularly preferably from 20% to 70%. These compounds have a dielectric anisotropy of $\Delta\epsilon \geqq +3$, in particular $\Delta\epsilon \geqq +8$, particularly preferably $\Delta\epsilon \geqq +12$.

Preferred liquid-crystal mixtures comprise one or more compounds of component B, preferably in a proportion of from 20 to 85%, particularly preferably in a proportion of from 30 to 75%. The compounds of group B, in particular those containing alkenyl groups, are distinguished, in particular, by their low values for the rotational viscosity $\gamma_1$.

Besides one or more compounds of the formulae I and II, component B preferably comprises one or more compounds selected from the group consisting of the bicyclic compounds of the following formulae:

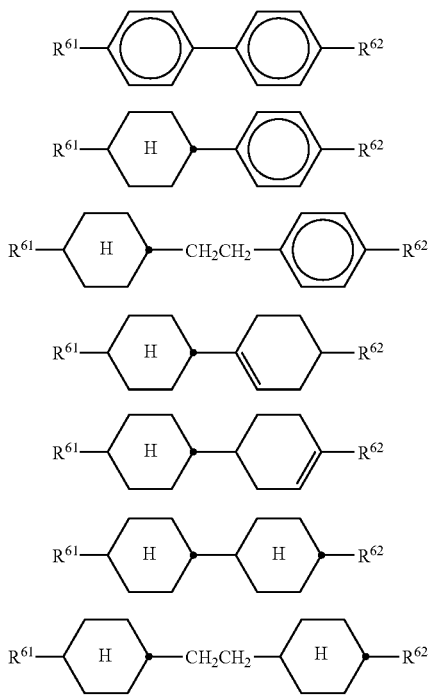

and/or one or more compounds selected from the group consisting of the tricyclic compounds of the following formulae:

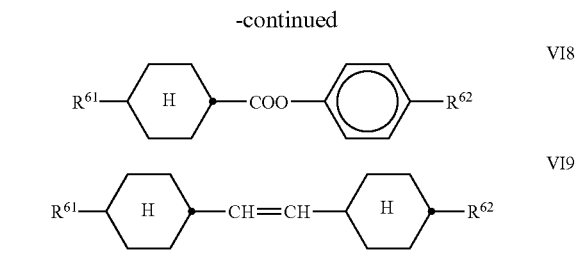

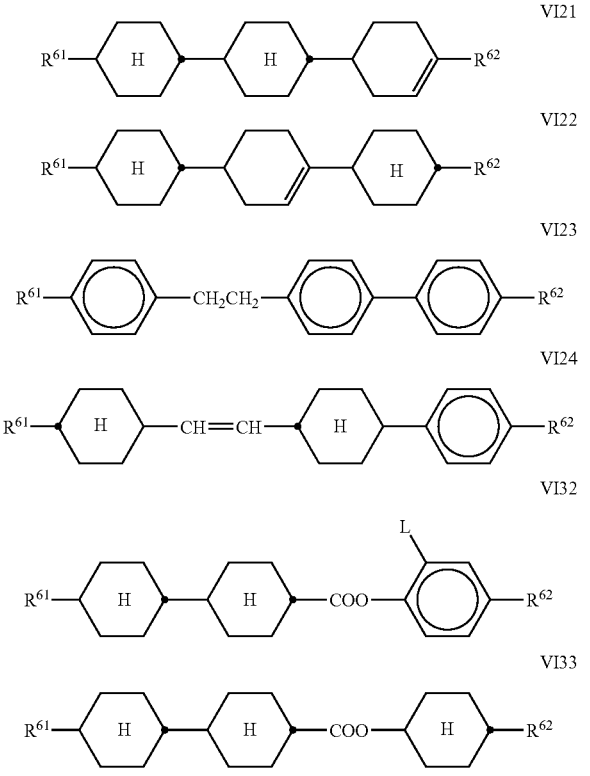

and/or one or more compounds selected from the group consisting of the tetracyclic compounds of the following formulae:

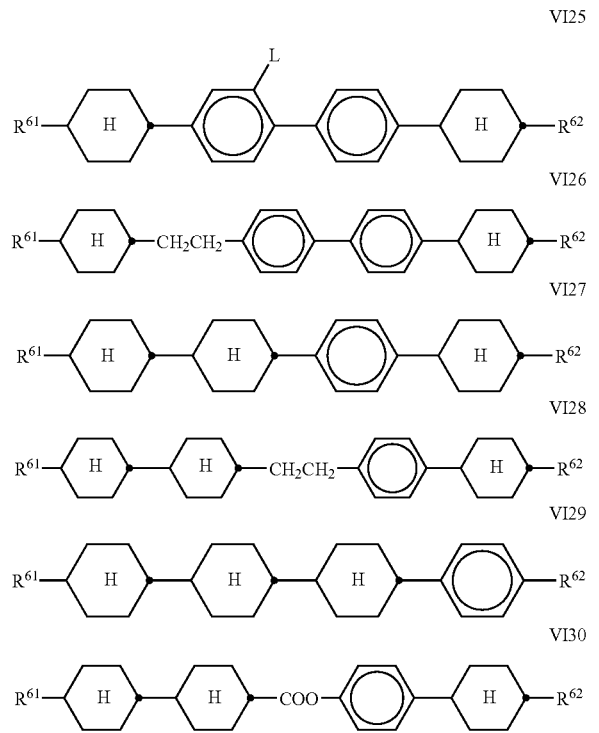

where

R$^{61}$ and R$^{62}$, independently of one another, are an alkyl or alkoxy radical having from 1 to 12 carbon atoms or an alkenyl radical having from 2 to 12 carbon atoms, where, in addition, one or more CH$_2$ groups in these radicals may be replaced by —O—, —S—, —C≡C—, —CO—, —OCO— or —COO— in such a way that heteroatoms are not linked directly to one another; and L is H or F.

The 1,4-phenylene groups in the formulae VI10 to VI19 and VI23 to VI32 may each, independently of one another, also be monosubstituted or poly-substituted by fluorine.

Particular preference is given to compounds of the formulae VI25 to VI31 in which R$^{61}$ is alkyl and R$^{62}$ is alkyl or alkoxy, in particular alkoxy, each having from 1 to 7 carbon atoms. Preference is furthermore given to compounds of the formulae VI25 and VI31 in which L=F. Preference is also given to compounds of the formula VI16 in which R$^{61}$ is alkenyl and R$^{62}$ is alkyl.

Very particular preference is given to compounds of the formulae VI25 and VI27 and compounds of the formula VI16.

R$^{61}$ and R$^{62}$ in the compounds of the formulae VI1 to VI30 are particularly preferably straight-chain alkyl or alkoxy having from 1 to 12 carbon atoms or straight-chain alkenyl having from 2 to 7 carbon atoms.

The liquid-crystalline mixtures optionally comprise an optically active component C in such an amount that the ratio between the layer thickness (separation of the outer plates) and the natural pitch of the chiral nematic liquid-crystal mixture is greater than 0.2. A multiplicity of chiral dopants, some of which are commercially available, is available for the component to the person skilled in the art, such as, for example, CB15, cholesteryl nonanoate, S-811 or S-1011 from Merck KGaA, Darmstadt. The choice of dopants is not crucial per se.

The proportion of the compounds of component C is preferably from 0 to 10%, in particular from 0 to 5%, particularly preferably from 0 to 3%.

Besides the compounds of the formula I, the mixtures according to the invention preferably comprise one or more liquid-crystalline tolan compounds.

Owing to the high birefringence Δn of the tolan compounds, it is possible to work with relatively small layer thicknesses, making the response times significantly shorter. The tolan compounds are preferably selected from the group consisting of Ta to Ti

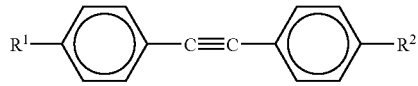

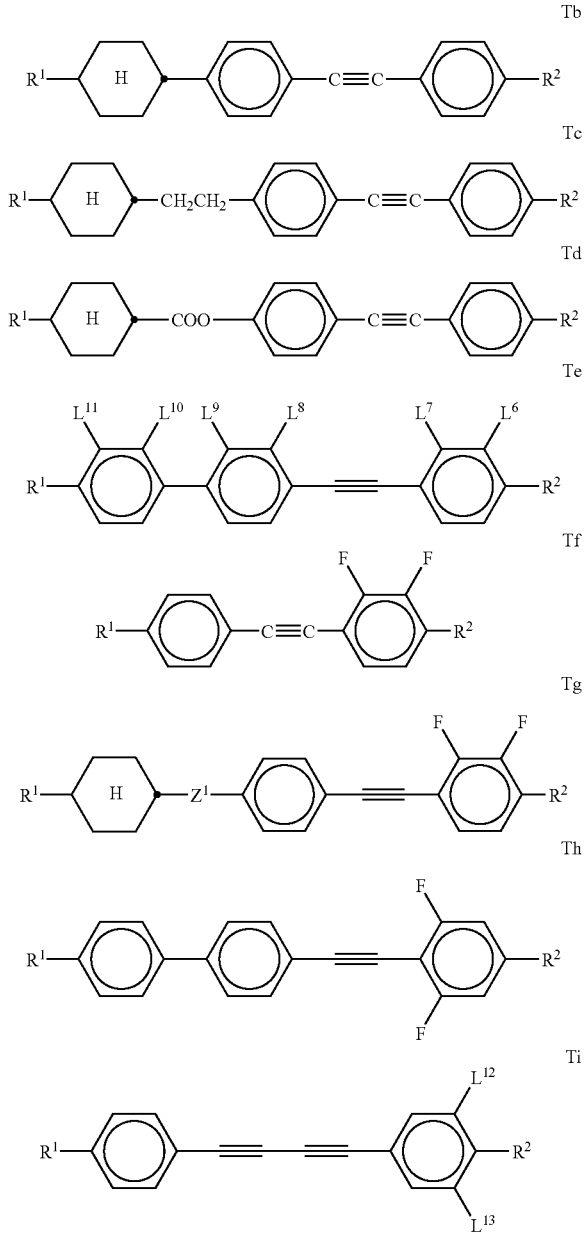

where $R^1$ is as defined for $R^{61}$ and $R^2$ is as defined for $R^{62}$;

$Z^1$ is —CO—O—, —CH$_2$CH$_2$— or a single bond; and $L^6$ to $L^{13}$ are each, independently of one another, H or F.

Preferred compounds of the formula Te are those in which one, two or three of the radicals $L^6$ to $L^{11}$ are F and the others are H, where $L^6$ and $L^7$ or $L^8$ and $L^9$ or $L^{10}$ and $L^{11}$ are not both simultaneously F. Preferred compounds of the formula Ti are those in which $L^{12}$ and $L^{13}$ are H.

Particular preference is given to compounds of the formulae Ta, Tb and Th. In these formulae, $R^1$ is preferably alkyl, while $R^{62}$ is preferably alkyl or alkoxy, in particular alkoxy for the compounds of the formulae Ta and Tb and in particular alkyl for the compounds of the formula Th, in each case having from 1 to 7 carbon atoms.

The proportion of the compounds from the group consisting of Ta and Tb is preferably from 5 to 50%, in particular from 10 to 40%. The proportion of the compounds of the formula Th is preferably from 2 to 35%, in particular from 4 to 25%.

The proportion of the compounds of the formulae Ta to Th is preferably from 2 to 55%, in particular from 5 to 35%.

The mixtures according to the invention may also optionally comprise up to 20% of one or more compounds having a dielectric anisotropy of less than −2 (component D).

If the mixtures comprise compounds of component D, these are preferably one or more compounds containing the structural unit 2,3-difluoro-1,4-phenylene, for example compounds in accordance with DE-A 38 07 801, 38 07 861, 38 07 863, 38 07 864 or 38 07 908. Particular preference is given to tolans containing this structural unit, in accordance with International Patent Application WO 88/07514.

Further known compounds of component D are, for example, derivatives of 2,3-dicyanohydroquinones or cyclohexane derivatives containing the

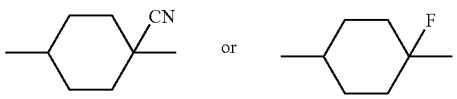

structural unit, in accordance with DE-A 32 31 707 or DE-A 34 07 013.

The liquid-crystal displays according to the invention preferably contain no compounds of component D.

In connection with the present invention, the term "alkyl"—unless defined otherwise elsewhere in this description or in the claims—denotes a straight-chain or branched aliphatic hydrocarbon radical having from 1 to 12 (i.e. 1, 2, 3, 4, 5, 6, 7, 8, 9, 10, 11 or 12) carbon atoms. If this alkyl radical is a saturated radical, it is also referred to as "alkanyl". It is also possible for one or more CH$_2$ groups in an alkyl radical to be replaced by —O— ("oxaalkyl" or "alkoxy"), —S— ("thioalkyl"), —C≡C— ("alkynyl"), —CO—, —CO—O— or —O—CO— in such a way that heteroatoms (O and S) are not linked directly to one another. Alkyl is preferably a straight-chain radical having 1, 2, 3, 4, 5, 6, 7 or 8 carbon atoms, in particular methyl, ethyl, n-propyl, n-butyl, n-pentyl, n-hexyl, n-heptyl or n-octyl.

The term alkoxy is taken to mean an O-alkyl radical in which the oxygen atom is bonded directly to the group substituted by the alkoxy radical or to the substituted ring, and alkyl is as defined above and is preferably unbranched. Preferred alkoxy radicals are methoxy, ethoxy, propoxy, butoxy, pentoxy, hexoxy, heptoxy and octoxy. Alkoxy is particularly preferably —OCH$_3$, —OC$_2$H$_5$, —O-n-C$_3$H$_7$, —O-n-C$_4$H$_9$ or —O-n-C$_5$H$_{11}$.

The term "alkenyl" denotes an aliphatic hydrocarbon radical having at least one C=C double bond and in connection with the present invention covers straight-chain and branched alkenyl groups having from 2 to 7 (i.e. 2, 3, 4, 5, 6 or 7) or from 2 to 12 (i.e. 2, 3, 4, 5, 6, 7, 8, 9, 10, 11 or 12) carbon atoms respectively, in particular the straight-chain groups. The term "alkenyl" also covers radicals having 2 or more C=C double bonds. Preferred alkenyl groups are C$_2$–C$_7$-1E-alkenyl, C$_4$–C$_7$-3E-alkenyl, C$_5$–C$_7$-4-alkenyl, C$_6$–C$_7$-5-alkenyl and C$_7$-6-alkenyl, in particular C$_2$–C$_7$-1E-alkenyl, C$_4$–C$_7$-3E-alkenyl and C$_5$–C$_7$-4-alkenyl. Examples of preferred alkenyl groups are vinyl, 1E-propenyl, 1E-butenyl, 1E-pentenyl, 1E-hexenyl, 1E-heptenyl, 3-butenyl, 3E-pentenyl, 3E-hexenyl, 3E-heptenyl, 4-pentenyl, 4Z-hexenyl, 4E-hexenyl, 4Z-heptenyl, 5-hexenyl, 6-heptenyl and the like. Groups having up to 5 carbon atoms are generally preferred.

The term "alkenyloxy" radical is taken to mean an O-alkenyl radical in which the oxygen atom is bonded directly to the group substituted by the alkenyloxy radical or to the substituted ring, and alkenyl is as defined above and is preferably unbranched.

Since one or more $CH_2$ groups in an alkyl radical may in accordance with the invention be replaced by —O—, the term "alkyl" also covers "oxaalkyl" radicals. In connection with the present invention, the term "oxaalkyl" denotes alkyl radicals in which at least one non-terminal $CH_2$ group has been replaced by —O— in such a way that no adjacent heteroatoms (O and S) are present. Oxaalkyl preferably covers straight-chain radicals of the formula —$C_aH_{2a+1}$—O—$(CH_2)_b$—, where a and b are each, independently of one another, 1, 2, 3, 4, 5, 6, 7, 8, 9 or 10; a is particularly preferably an integer from 1 to 6, and b is 1 or 2.

If one or more $CH_2$ groups in an alkyl radical as defined above have been replaced by sulfur, a "thioalkyl" radical is present. "Thioalkyl" preferably covers a straight-chain radical of the formula $C_aH_{2a+1}$—S—$(CH_2)_b$—, where a is 1, 2, 3, 4, 5, 6, 7, 8, 9 or 10, and b is 0, 1, 2, 3, 4, 5, 6, 7, 8, 9 or 10; a is particularly preferably an integer from 1 to 6, and b is 0, 1 or 2.

If one or more $CH_2$ groups in an alkyl radical or alkenyl radical have been replaced by —C≡C—, an alkynyl radical or alkenynyl radical is present. Replacement of one or more $CH_2$ groups by —CO—, —CO—O— or —O—CO— is also possible.

The individual compounds of the formulae I, II, IIA, III, IV, V, VI and T or the sub-formulae thereof and also other compounds which can be used in the TN and STN displays according to the invention are either known or can be prepared analogously to the known compounds. Thus, processes for the preparation of compounds of the formula I are known, for example, from DE 4414 647 A1.

In particularly preferred embodiments, the mixtures comprise one or more compounds selected from the formulae Ia to Ie, in particular Ia and/or Ie;

one or more compounds of the formulae IIa to IIi, in particular IIe, IIf and IIg;

one or two compounds of the formula IIA, very particularly preferably of the formula IIAa, in particular those in which $R^{21Aa}$ is H or $CH_3$;

one or more compounds of the formulae IIIb-1, IIIb-2, IIIc-1, IIIc-2 and IIIc-3, in particular of the formulae IIIc-1, IIIc-2 and IIIc-3;

from 1 to 25%, particularly preferably from 2 to 20%, in particular from 3 to 15%, of one or more compounds of the formula I;

from 3 to 60%, particularly preferably from 6 to 50%, in particular from 8 to 40%, of one or more compounds of the formula II;

from 5 to 45%, particularly preferably from 10 to 40%, in particular from 15 to 35%, of one or more alkenyl compounds of the formula IIA;

from 5 to 55%, particularly preferably from 10 to 50%, in particular from 15 to 45%, of one or more compounds of the formula III;

one or more compounds of the formulae VI9 and/or VI24 in which $R^{61}$ is alkenyl having from 2 to 7 carbon atoms and $R^{62}$ is as defined above;

one or more compounds of the formulae VI25 and/or VI27, where L in the formula VI25 is H or F, in particular F;

one or more compounds of the formula VI16 in which $R^{61}$ is an unbranched alkenyl radical and $R^{62}$ is an unbranched alkyl radical;

one or more compounds of the formulae Ta, Tb and/or Th;

more than 20% of compounds of positive dielectric anisotropy, in particular having $\Delta\epsilon \geq +12$.

The mixtures according to the invention are distinguished—in particular on use in TN and STN displays of high layer thicknesses—by very low total response times ($t_{tot}=t_{on}+t_{off}$).

The liquid-crystal mixtures used in the TN and STN cells according to the invention are dielectrically positive, with $\Delta\epsilon \geq 1$. Particular preference is given to liquid-crystal mixtures with $\Delta\epsilon \geq 3$, in particular with $\Delta\epsilon \geq 5$.

The liquid-crystal mixtures according to the invention have favourable values for the threshold voltage $V_{10/0/20}$ and for the rotational viscosity $\gamma_1$. If the value for the optical path difference d·Δn is pre-specified, the value for the layer thickness d is determined by the optical anisotropy Δn. In particular at relatively high values for d·Δn, the use of liquid-crystal mixtures according to the invention having a relatively high value for the optical anisotropy is generally preferred, since the value for d can then be selected to be relatively small, which results in more favourable values for the response times. However, liquid-crystal displays according to the invention which contain liquid-crystal mixtures according to the invention with smaller values for Δn are also characterised by advantageous values for the response times.

The liquid-crystal mixtures according to the invention are furthermore characterised by advantageous values for the steepness of the electro-optical characteristic line, and can be operated with high multiplex rates, in particular at temperatures above 20° C. In addition, the liquid-crystal mixtures according to the invention have high stability and favourable values for the electrical resistance and the frequency dependence of the threshold voltage. The liquid-crystal displays according to the invention have a large working-temperature range and good angle dependence of the contrast.

The construction of the liquid-crystal display elements according to the invention from polarisers, electrode base plates and electrodes having a surface treatment such that the preferential alignment (director) of the liquid-crystal molecules in each case adjacent thereto is usually twisted by a value of from 1600 to 720° from one electrode to the other corresponds to the usual structure for display elements of this type. The term "usual structure" here is broadly drawn and also covers all derivatives and modifications of the TN and STN cell, in particular also matrix display elements and display elements containing additional magnets.

The surface tilt angle at the two outer plates may be identical or different. Identical tilt angles are preferred. Preferred TN displays have pre-tilt angles between the longitudinal axis of the molecules at the surface of the outer plates and the outer plates of from 0° to 70, preferably from 0.01° to 5°, in particular from 0.1 to 2°. In the STN displays, the pre-tilt angle is from 1° to 30°, preferably from 1° to 12° and in particular from 3° to 10°.

The twist angle of the TN mixture in the cell has a value of between 22.5° and 170°, preferably between 45° and 130° and in particular between 80° and 115°. The twist angle of the STN mixture in the cell from alignment layer to alignment layer has a value of between 100° and 600°, preferably between 170° and 300° and in particular between 180° and 270°.

The liquid-crystal mixtures which can be used in accordance with the invention are prepared in a manner which is conventional per se. In general, the desired amount of the components used in lesser amount are dissolved in the components making up the principal constituent, advantageously at elevated temperature. It is also possible to mix solutions of the components in an organic solvent, for example in acetone, chloroform or methanol, and to remove the solvent again, for example by distillation, after thorough mixing.

The liquid-crystal mixtures according to the invention are also suitable for use as liquid-crystal (LC) media in cholesteric liquid-crystal (CLC) displays, in particular SSCT ("surface stabilised cholesteric texture") and PSCT ("polymer stabilised cholesteric texture") displays, as described, for example, in WO 92/19695, U.S. Pat. No. 5,384,067, U.S. Pat. No. 5,453,863, U.S. Pat. No. 6,172,720 or U.S. Pat. No. 5,661,533. CLC displays typically contain a cholesteric LC medium consisting of a nematic component and an optically active component which has significantly higher helical twist compared with TN and STN displays, and exhibits selective reflection of circular-polarised light. The reflection wavelength corresponds to the product of the pitch of the cholesteric helix and the average refractive index of the CLC medium.

For this purpose, one or more chiral dopants are added to the LC mixtures according to the invention, with their twisting power and concentration being selected in such a way that the LC medium has a cholesteric phase at room temperature and has a reflection wavelength which is preferably in the visible, UV or IR region of the electromagnetic spectrum, in particular between 400 and 800 nm.

Suitable dopants are known to the person skilled in the art and are commercially available, such as, for example, cholesteryl nonanoate (CN), CB15, R/S-811, R/S-1011, R/S-2011, R/S-3011 or R/S-4011 (Merck KGaA, Darmstadt). Particular preference is given to highly twisted dopants having a chiral sugar radical, in particular dianhydrohexitol derivatives, such as, for example, derivatives of isosorbitol, isomannitol or isoiditol, preferably sorbitol derivatives as described in WO 98/00428. Preference is furthermore given to chiral ethanediol derivatives, such as 1,2-derivatives of diphenyl-1,2-dihydroxyethane (benzylene glycol and hydrobenzoin), preferably mesogenic hydrobenzoin derivatives as described in GB-A-2,328,207. Very particularly preferred dopants are chiral binaphthyl derivatives, as described in WO 02/94805, chiral binaphthol acetal derivatives, as described in WO 02/34739, chiral TADDOL derivatives, as described in WO 02/06265, and chiral dopants containing at least one fluorinated bridging group and a terminal or central chiral group, as described in WO 02/06196 and WO 02/06195.

If two or more dopants are added, these can have the same or opposite direction of rotation and the same or opposite temperature dependence of the twist.

The present invention furthermore relates to CLC media comprising, as nematic component, an LC mixture according to the invention and, as optically active component, one or more chiral dopants. The present invention furthermore relates to CLC displays, in particular SSCT and PSCT displays, containing CLC media as described above.

The dielectrics may also comprise further additives known to the person skilled in the art and described in the literature. For example, 0–15% of pleochroic dyes can be added.

In the present application and in the following examples, the structures of the liquid-crystal compounds are indicated by means of acronyms, with the transformation into chemical formulae taking place in accordance with Tables A and B below. All radicals $C_nH_{2n+1}$ and $C_mH_{2m+1}$ are straight-chain alkyl radicals having n and m carbon atoms respectively. The alkenyl radicals have the trans-configuration. The coding in Table B is self-evident. In Table A, only the acronym for the parent structure is given. In individual cases, the acronym for the parent structure is followed, separated by a dash, by the code indicated in the following table for the substituents $R^1$, $R^2$, $L^1$, $L^2$ and $L^3$:

| Code for $R^1$, $R^2$, $L^1$, $L^2$, $L^3$ | $R^1$ | $R^2$ | $L^1$ | $L^2$ | $L^3$ |
| --- | --- | --- | --- | --- | --- |
| nm | $C_nH_{2n+1}$ | $C_mH_{2m+1}$ | H | H | H |
| nO.m | $OC_nH_{2n+1}$ | $C_mH_{2m+1}$ | H | H | H |
| nOm | $C_nH_{2n+1}$ | $OC_mH_{2m+1}$ | H | H | H |
| n | $C_nH_{2n+1}$ | CN | H | H | H |
| nN.F | $C_nH_{2n+1}$ | CN | H | H | F |
| nN.F.F | $C_nH_{2n+1}$ | CN | H | F | F |
| nF | $C_nH_{2n+1}$ | F | H | H | H |
| nOF | $OC_nH_{2n+1}$ | F | H | H | H |
| nF.F | $C_nH_{2n+1}$ | F | H | H | F |
| nmF | $C_nH_{2n+1}$ | $C_mH_{2m+1}$ | F | H | H |
| nOCF$_3$ | $C_nH_{2n+1}$ | OCF$_3$ | H | H | H |
| n-Vm | $C_nH_{2n+1}$ | —CH=CH—$C_mH_{2m+1}$ | H | H | H |
| nV-Vm | $C_nH_{2n+1}$—CH=CH— | —CH=CH—$C_mH_{2m+1}$ | H | H | H |

The TN and STN displays preferably contain liquid-crystalline mixtures composed of one or more compounds from Tables A and B.
TABLE A
($L^1$, $L^2$, $L^3$ = H or F)
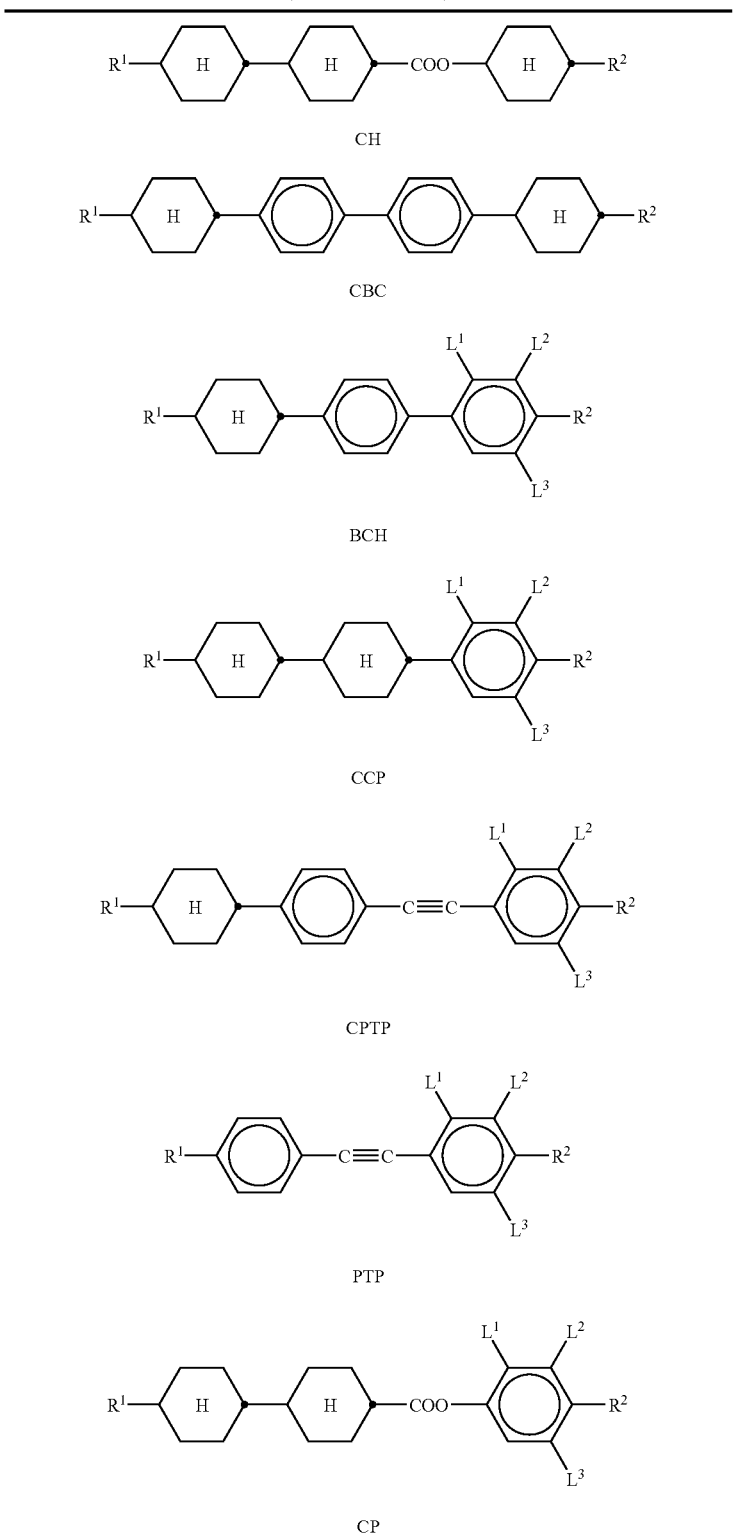

TABLE A-continued ($L^1, L^2, L^3$ = H or F)

ME: R¹—⌬—COO—⌬(L¹,L²,L³)—R²

HP: R¹—H—⌬—COO—⌬(L¹,L²,L³)—R²

PCH: R¹—H—⌬(L¹,L²,L³)—R²

K3'n: $C_nH_{2n+1}$—⌬—⌬—CN

CCH: R¹—H—H—R²

CCPC: R¹—H—H—COO—⌬—H—R²

TABLE B

CVCP-nV-(O)m: $C_nH_{2n+1}$—CH=CH—H—CH=CH—H—⌬—(O)$C_mH_{2m+1}$

CC-nV-Vm: $C_nH_{2n+1}$—CH=CH—H—H—CH=CH—$C_mH_{2m+1}$

TABLE B-continued
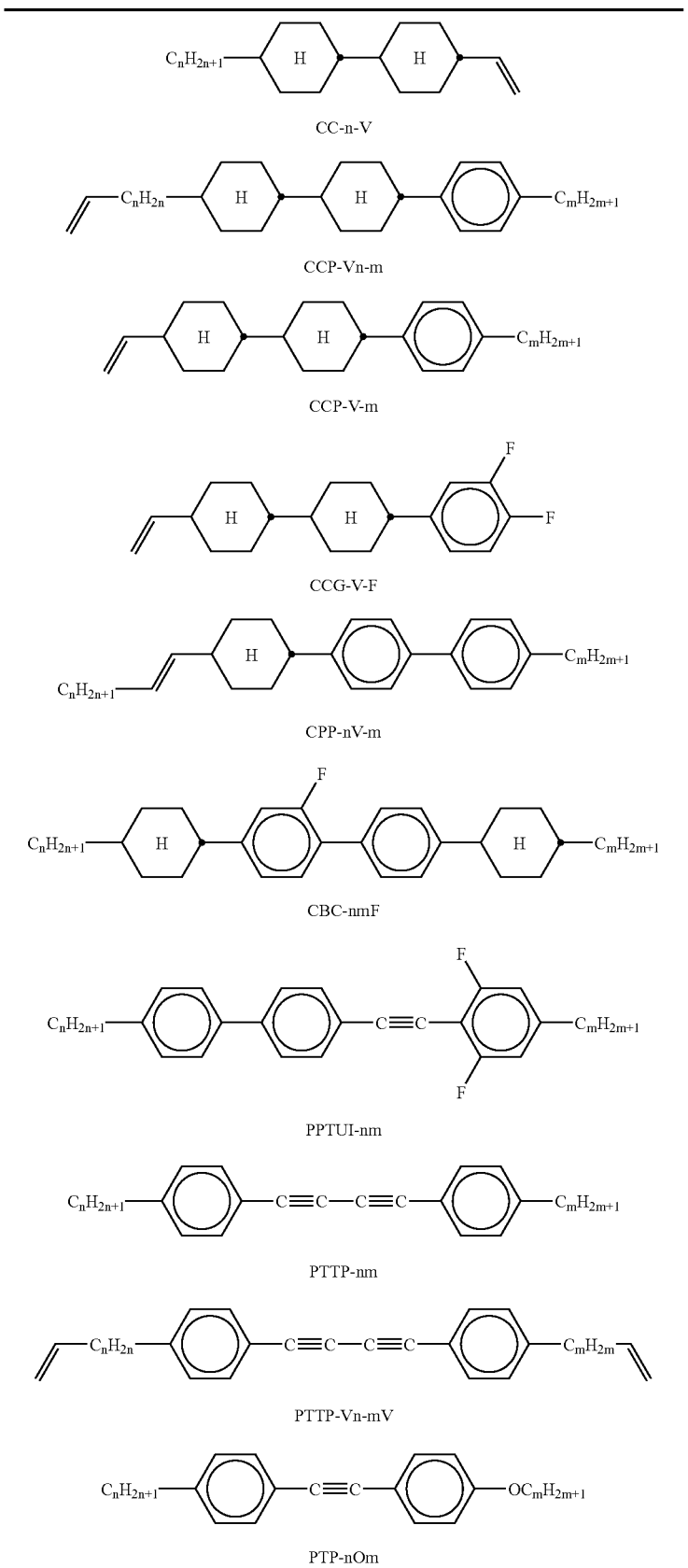

TABLE B-continued
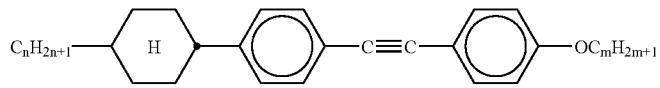
CPTP-nOm
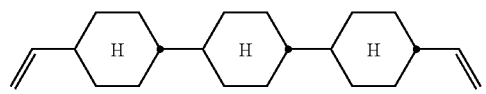
CCC-V-V
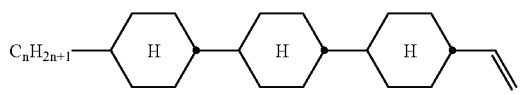
CCC-n-V
TABLE C
Table C shows some of the dopants which are suitable for doping the liquid-crystalline mixtures.
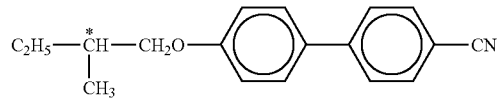
C 15
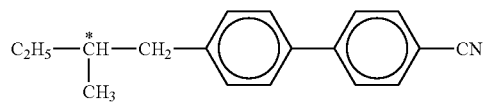
CB 15
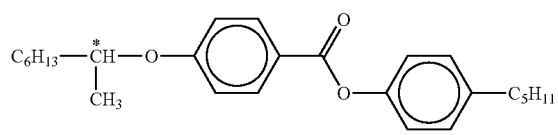
CM 21
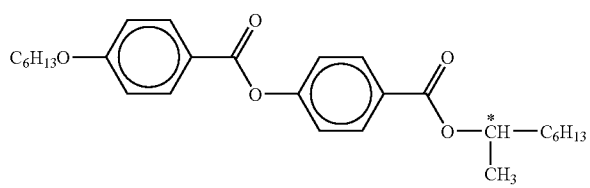
R/S-811
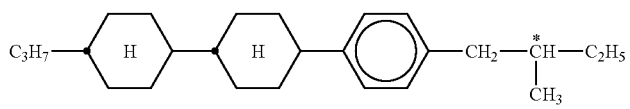
CM 44
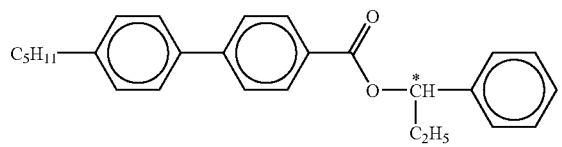

TABLE C-continued
Table C shows some of the dopants which are suitable for doping the liquid-crystalline mixtures.
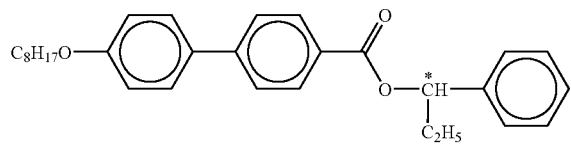
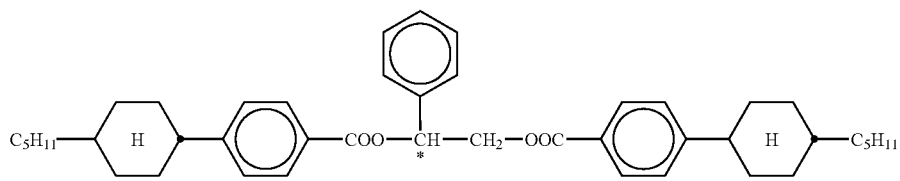
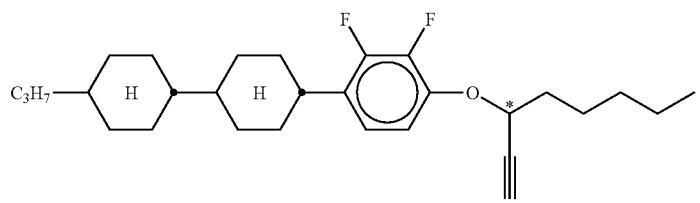
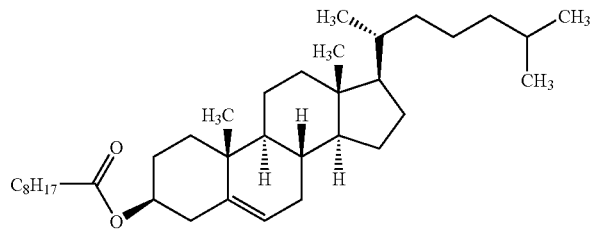
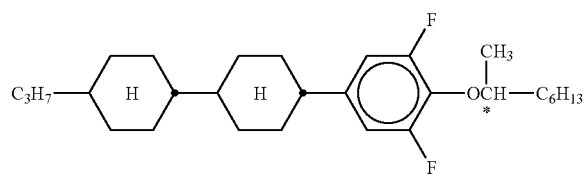
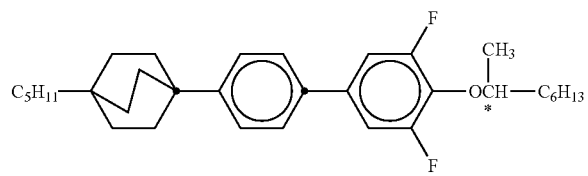

The following examples are intended to explain the invention without limiting it. The following abbreviations are used:

cl.p. clearing point (nematic-isotropic phase-transition temperature)

S-N smectic-nematic phase-transition temperature visc. flow viscosity (at 20° C. unless stated otherwise)

Δn optical anisotropy (589 nm, 20° C.)

$n_o$ ordinary refractive index (589 nm, 20° C.)

Δε dielectric anisotropy (1 kHz, 20° C.)

$\varepsilon_\perp$ dielectric constant perpendicular to the longitudinal molecular axis (1 kHz, 20° C.)

$\gamma_1$ rotational viscosity

S characteristic line steepness=$V_{90}/V_{10}$ $V_{10}$ threshold voltage=characteristic voltage at a relative contrast of 10%

$V_{90}$ characteristic voltage at a relative contrast of 90%

$t_{tot}$ $t_{on}+t_{off}$ $t_{ave}$ $$\frac{t_{on} + t_{off}}{2} \text{ (average response time)}$$

$t_{on}$ time from switching on until 90% of the maximum contrast has been reached $t_{off}$ time from switching off until 10% of the maximum contrast has been reached Mux multiplex rate $t_{store}$ low-temperature storage stability in hours (−20° C., −30° C., −40° C.)

The parameters were determined as described in the brochure "Merck Liquid Crystals. Licristal®. Physical Properties of Liquid Crystals", Ed. Dr W. Becker, Merck KGaA, Darmstadt, 1998.

Above and below, all temperatures are indicated in ° C. The percentages are percent by weight. All values are based on 20° C., unless stated otherwise. The displays are driven, unless stated otherwise, at a multiplex rate of 1/48 and a bias of 1/8. The twist is 240°, unless stated otherwise.

COMPARATIVE EXAMPLE

A TN and STN mixture consisting of

| ME2N.F | 4.25% | cl.p.: | 95.0° C. |
|---|---|---|---|
| ME3N.F | 4.25% | Δn: | 0.1370 |
| ME4N.F | 12.00% | Δε | +16.1 |
| ME5N.F | 7.00% | $V_{10}$: | 1.63 V |
| CC-5-V | 19.50% | S: | 1.101 |
| CCG-V-F | 20.00% | $t_{tot}$: | 285 ms |
| CCP-V-1 | 10.00% | | |
| CCP-V2-1 | 4.50% | | |
| CCPC-33 | 2.00% | | |
| CBC-33 | 2.00% | | |
| PTP-102 | 4.50% | | |
| CPTP-301 | 4.00% | | |
| CPTP-302 | 3.00% | | |
| CPTP-303 | 3.00% | | |

EXAMPLE 1

A TN and STN mixture consisting of

| ME2N.F | 4.30% | cl.p.: | 93.5° C. |
|---|---|---|---|
| ME3N.F | 4.33% | Δn: | 0.1378 |
| ME4N.F | 12.14% | Δε | +16.2 |
| ME5N.F | 7.13% | $V_{10}$: | 1.60 V |
| CC-5-V | 17.77% | S: | 1.104 |
| CCG-V-F | 20.31% | $t_{tot}$: | 260 ms |
| CCP-V-1 | 10.16% | | |
| CCP-V2-1 | 4.54% | | |
| PTP-102 | 4.61% | | |
| CPTP-301 | 4.09% | | |
| CPTP-302 | 4.14% | | |
| CPTP-303 | 3.04% | | |
| CCC-V-V | 3.44% | | | has a reduced response time and reduced threshold voltage compared with Comparative Example 1 while retaining the other favourable properties.

EXAMPLE 2

A TN and STN mixture consisting of

| ME2N.F | 4.25% | cl.p.: | 95.00° C. |
|---|---|---|---|
| ME3N.F | 4.25% | Δn: | 0.1364 |
| ME4N.F | 12.00% | Δε | +15.6 |
| ME5N.F | 7.00% | $V_{10}$: | 1.63 V |
| CC-5-V | 20.00% | S: | 1.104 |
| CCC-2-V | 2.00% | $t_{tot}$: | 260 ms |
| CCC-3-V | 2.00% | | |
| CCG-V-F | 17.50% | | |
| CCP-V-1 | 10.00% | | |
| CCP-V2-1 | 4.00% | | |
| CBC-33 | 2.00% | | |
| PTP-102 | 5.00% | | |
| CPTP-301 | 4.00% | | |
| CPTP-302 | 3.00% | | |
| CPTP-303 | 3.00% | | | has a reduced response time compared with Comparative Example 1 while retaining the other favourable properties.

Without further elaboration, it is believed that one skilled in the art can, using the preceding description, utilize the present invention to its fullest extent. The preceding preferred specific embodiments are, therefore, to be construed as merely illustrative, and not limitative of the remainder of the disclosure in any way whatsoever.

In the foregoing and in the examples, all temperatures are set forth uncorrected in degrees Celsius and, all parts and percentages are by weight, unless otherwise indicated.

The entire disclosure of all applications, patents and publications, cited herein and of corresponding German application No. 10306399.4, filed Feb. 15, 2003 is incorporated by reference herein.

The preceding examples can be repeated with similar success by substituting the generically or specifically described reactants and/or operating conditions of this invention for those used in the preceding examples.

From the foregoing description, one skilled in the art can easily ascertain the essential characteristics of this invention and, without departing from the spirit and scope thereof, can make various changes and modifications of the invention to adapt it to various usages and conditions.

The invention claimed is:

1. A liquid-crystal mixture comprising a compound of formula I

I wherein
$R^{11}$ is an alkenyl radical having 2 to 7 carbon atoms; and
$R^{12}$ is an alkenyl radical having 2 to 7 carbon atoms,
and a compound of formula IIA

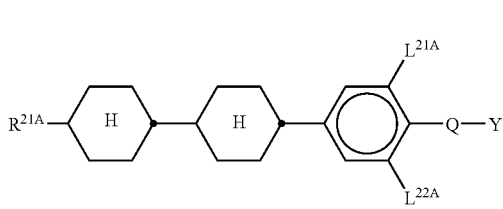
IIA wherein
$R^{21A}$ is an alkenyl radical having 2 to 7 carbon atoms;
Q is $CF_2$, $OCF_2$, CFH, OCFH or a single bond;
Y is F or Cl; and
$L^{21A}$ and $L^{22A}$ are each, independently of one another, H or F.

2. A liquid-crystal mixture according to claim 1, wherein
$R^{11}$ is $CH_2$=CH— or $CH_3$—CH=CH—; and
$R^{12}$ is $CH_2$=CH— or $CH_3$—CH=CH—.

3. A liquid-crystal mixture according to claim 1, wherein the compound of the formula I is present in the liquid-crystal mixture in an amount of 1 to 25% by weight.

4. A liquid-crystal mixture according to claim 1, further comprising a compound of formula II

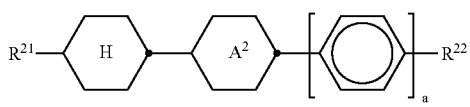
II wherein
$R^{21}$ is an alkenyl or alkenyloxy radical having 2 to 7 carbon atoms;
$R^{22}$ is an alkyl or alkoxy radical having 1 to 12 carbon atoms or an alkenyl or alkenyloxy radical having 2 to 12 carbon atoms, in which optionally, one or more $CH_2$ groups are replaced by —O—, —S—, —C≡C—, —CO—, —OCO— or —COO— in such a way that heteroatoms are not linked directly to one another;
the ring $A^2$ is 1,4-phenylene or trans-1,4-cyclohexylene; and
a is 0 or 1;
wherein at least one of radicals $R^{21}$ and $R^{22}$ is an alkenyl radical.

5. A liquid-crystal mixture according to claim 1, further comprising a compound of formulae IIIa to IIIh:

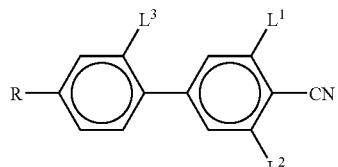
IIIa

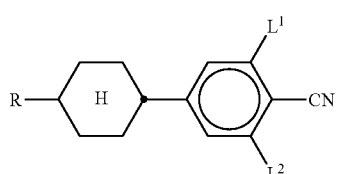
IIIb

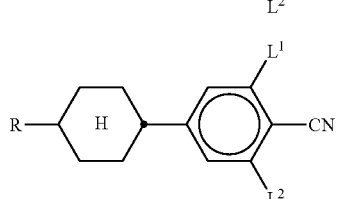
IIIc

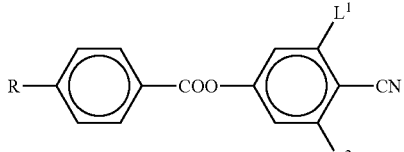
IIId

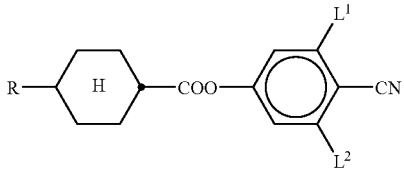
IIIe

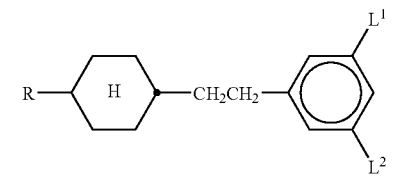
IIIf

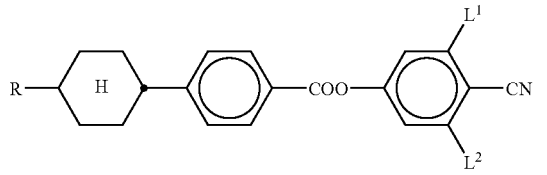
IIIg

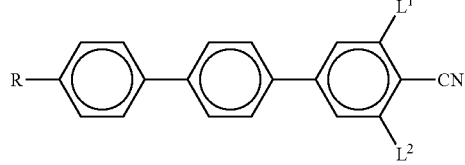
IIIh

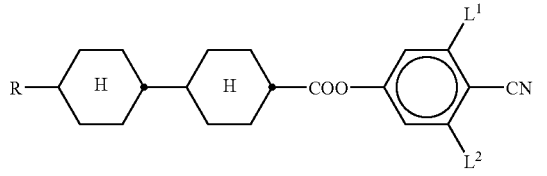

wherein
R is an alkyl or alkoxy radical having 1 to 12 carbon atoms or an alkenyl radical having 2 to 12 carbon atoms, in which optionally one or more $CH_2$ groups are replaced by —O—, —S—, —C≡C—, —CO—, —OCO— or —COO— in such a way that heteroatoms are not linked directly to one another; and $L^1$, $L^2$ and $L^3$ are each, independently of one another, H or F.

6. A liquid-crystal mixture according to claim 5, wherein the liquid-crystal mixture comprises a compound of formula IIIb or IIIc.

7. A liquid-crystal mixture according to claim 1, further comprising a tolan compound of formula Ta to Ti:

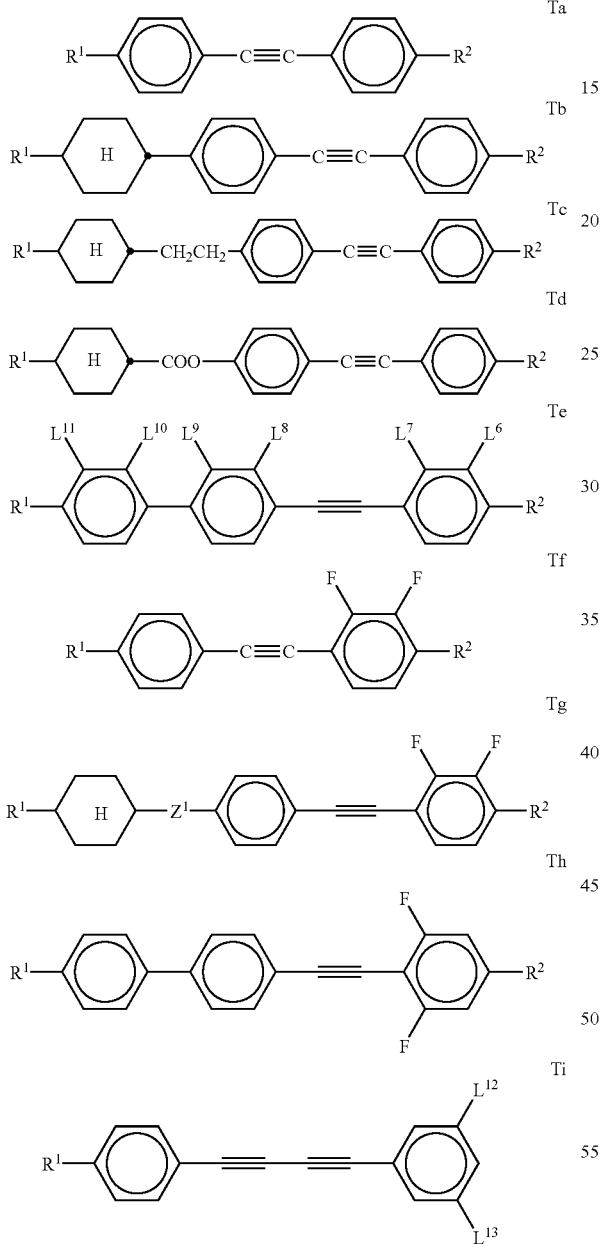

wherein
$R^1$ and $R^2$ are, independently of one another, an alkyl or alkoxy radical having 1 to 12 carbon atoms or an alkenyl radical having 2 to 12 carbon atoms, in which optionally one or more $CH_2$ groups are replaced by —O—, —S—, —C≡C—, —CO—, —OCO— or —COO— in such a way that heteroatoms are not linked directly to one another;

$Z^1$ is —CO—O—, —$CH_2CH_2$— or a single bond; and
$L^6$ to $L^{13}$ are each, independently of one another, H or F.

8. A liquid-crystal display containing a liquid-crystal mixture according to claim 1.

9. A TN or STN liquid-crystal display comprising
two outer plates, which, together with a frame, form a cell,
a nematic liquid-crystal mixture of positive dielectric anisotropy located in the cell,
electrode layers with alignment layers on the insides of the outer plates,
a tilt angle between the longitudinal axis of the molecules at the surface of the outer plates and the outer plates of from 0 degree to 30 degrees,
a twist angle of the liquid crystal mixture in the cell from alignment layer to alignment layer with a value of between 22.5° and 600°,
a nematic liquid-crystal mixture comprising
a) 15–80% by weight of a liquid-crystalline component A consisting of one or more compounds having a dielectric anisotropy of greater than +1.5;
b) 20–85% by weight of a liquid-crystalline component B consisting of one or more compounds having a dielectric anisotropy of between −1.5 and +1.5;
c) 0–20% by weight of a liquid-crystalline component D consisting of one or more compounds having a dielectric anisotropy of below −1.5, and
d) optionally, an optically active component C in such an amount that the ratio between the layer thickness and the natural pitch of the chiral nematic liquid-crystal mixture is from about 0.2 to 1.3,
wherein the nematic liquid-crystal mixture is according to claim 1.

10. A cholesteric liquid-crystal display, SSCT or PSCT display comprising one or more chiral dopants and a liquid-crystal mixture according to claim 1.

11. A liquid-crystal mixture according to claim 1, wherein the compound of the formula I is present in the liquid-crystal mixture in an amount of 2 to 20% by weight.

12. A liquid-crystal mixture according to claim 1, wherein the compound of the formula I is present in the liquid-crystal mixture in an amount of 3 to 15% by weight.

13. A liquid-crystal mixture according to claim 1, comprising a compound of formula Ia, Ib, or Ic:

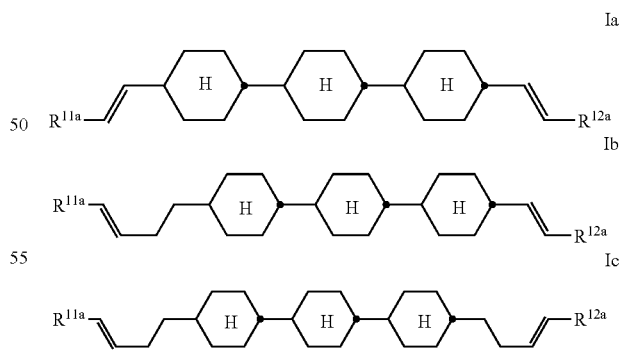

in which $R^{11a}$ and $^{12a}$ are each, independently of one another, H, $CH_3$, $C_2H_5$ or n-$C_3H_7$.

14. A liquid-crystal mixture according to claim 13, comprising a compound of formula Ia.

15. A liquid-crystal mixture according to claim 14, wherein $R^{11a}$ and $R^{12a}$ are, each independently H or $CH_3$.

* * * * *

UNITED STATES PATENT AND TRADEMARK OFFICE
CERTIFICATE OF CORRECTION

PATENT NO. : 7,220,464 B2  
APPLICATION NO. : 10/777203  
DATED : May 22, 2007  
INVENTOR(S) : Harald Hirschmann It is certified that error appears in the above-identified patent and that said Letters Patent is hereby corrected as shown below:

Column 36, line 35 reads " 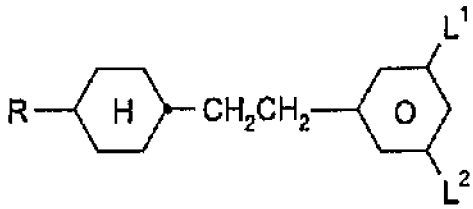 " should read

R—(H)—CH₂CH₂—(O)—CN with L¹, L² substituents

Column 38, line 61 reads "n-C₃H₇." should read -- n-C₃H₇, and alkyl is an alkyl group having from 1 to 8 carbon atoms. --

Signed and Sealed this

Eleventh Day of December, 2007

JON W. DUDAS  
*Director of the United States Patent and Trademark Office*